United States Patent
Sng

(10) Patent No.: US 8,286,197 B2
(45) Date of Patent: Oct. 9, 2012

(54) METHOD AND SYSTEM FOR COMPREHENSIVE SOCKET APPLICATION PROGRAMMING INTERFACE LOOPBACK PROCESSING

(75) Inventor: Swee Huat Sng, Torrance, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1113 days.

(21) Appl. No.: 12/218,636

(22) Filed: Jul. 17, 2008

(65) Prior Publication Data

US 2010/0017811 A1    Jan. 21, 2010

(51) Int. Cl.
- *G06F 3/00* (2006.01)
- *G06F 15/177* (2006.01)
- *G06F 15/173* (2006.01)
- *G06F 11/00* (2006.01)
- *G01R 31/28* (2006.01)

(52) U.S. Cl. ........ 719/328; 719/310; 719/313; 709/220; 709/223; 370/249; 714/716

(58) Field of Classification Search ........................ None
See application file for complete search history.

(56) References Cited

U.S. PATENT DOCUMENTS

| | | | | |
|---|---|---|---|---|
| 6,192,417 | B1 * | 2/2001 | Block et al. | 709/249 |
| 7,020,700 | B1 * | 3/2006 | Bennett et al. | 709/224 |
| 2006/0007913 | A1 * | 1/2006 | Botkin et al. | 370/352 |
| 2006/0056303 | A1 * | 3/2006 | Aggarwal et al. | 370/248 |
| 2006/0069789 | A1 * | 3/2006 | Kridner | 709/230 |
| 2006/0075119 | A1 * | 4/2006 | Hussain et al. | 709/227 |
| 2006/0075123 | A1 * | 4/2006 | Burr et al. | 709/228 |
| 2006/0227808 | A1 * | 10/2006 | Estable | 370/466 |
| 2007/0233897 | A1 | 10/2007 | Craft et al. | 709/238 |
| 2008/0240130 | A1 * | 10/2008 | Oved | 370/401 |

FOREIGN PATENT DOCUMENTS

| | | |
|---|---|---|
| JP | 5-103043 | 4/1993 |
| JP | 2003-274100 | 9/2003 |
| JP | 2004-355511 | 12/2004 |

\* cited by examiner

*Primary Examiner* — Emerson Puente
*Assistant Examiner* — Adam Lee
(74) *Attorney, Agent, or Firm* — Scot A. Reader

(57) ABSTRACT

Methods and systems for comprehensive socket API loopback processing on a computing device. In an exemplary method and system, a socket API processes loopback calls without resort to a TCP/IP protocol stock or lower level systems (e.g. network drivers), reducing overhead requirements and processing burdens imposed on the TCP/IP stack and lower level systems and improving overall computing device performance.

14 Claims, 3 Drawing Sheets

METHOD AND SYSTEM FOR COMPREHENSIVE SOCKET APPLICATION PROGRAMMING INTERFACE LOOPBACK PROCESSING

BACKGROUND OF THE INVENTION

The present invention relates to loopback networking and, more particularly, to a loopback networking implementation that reduces computing device overhead and improves computing device performance.

The Internet Protocol (IP) defines a loopback networking function. Most IP version 4 (IPv4) implementations use 127.0.0.1 as the loopback address while IP version 6 (IPv6) implementations typically use ::1 as the loopback address.

In the loopback function, a network application running on a computing device can address and communicate internally with another process running on the computing device using the loopback address. One common use for the loopback function is internal testing for verification of a process's operability and design. For example, on a computing device that has a web browser and a web server that hosts a website, the website can be accessed by pointing the web browser at the Uniform Resource Locator (URL) http://127.0.0.1 and tested without exposing the website to an external network.

In current versions of network capable operating systems (e.g. Windows, vxWorks), the loopback address is treated in many ways like an IP address of a remote host. The loopback address has an entry in the routing table and belongs to a valid subnet. When an application calls an internal process using the loopback address, the socket application programming interface (socket API) (e.g. Winsock for Windows, sockLib for vxWorks) passes the call to the Transmission Control Protocol/IP (TCP/IP) protocol stack of the operating system, which consults the routing table to make a routing decision, and then forwards the call to a virtual network device driver within the input/output (I/O) subsystem of the operating system en route to the internal process. The virtual network device driver performs additional loopback processing, such as buffering data transmitted between the application and the internal process. The loopback function within these operating system architectures, which invokes the TCP/IP protocol stack and a low level virtual network device driver for loopback processing including routing, buffering and housekeeping, is thus very inefficient.

SUMMARY OF THE INVENTION

The present invention, in a basic feature, provides comprehensive socket API loopback processing. In accordance with the principles of the present invention, loopback processing on a computing device is performed by a socket API without resort to a TCP/IP protocol stack or lower level systems (e.g. network drivers), reducing overhead requirements and processing burdens imposed on the TCP/IP stack and lower level systems and improving overall computing device performance.

In one aspect of the invention, a network capable computing device comprises an application, a socket API operatively coupled with the application and a TCP/IP protocol stack operatively coupled with the socket API, wherein the socket API receives a call from the application and selectively invokes the TCP/IP protocol stack to process the call based on a determination by the socket API of whether the call is a loopback call.

In some embodiments, the socket API processes the call without resort to the TCP/IP protocol stack in response to determining that the call is a loopback call.

In some embodiments, the socket API invokes the TCP/IP protocol stack in response to determining that the call is a non-loopback call.

In some embodiments, processing of the call by the socket API comprises storing data received on the call in a data store of the socket API.

In some embodiments, processing of the call by the socket API comprises retrieving data requested on the call from a data store of the socket API and transmitting the data to the application.

In some embodiments, the determination comprises determining whether the call is associated with a loopback destination.

In some embodiments, the determination comprises determining whether the call is addressed to a loopback address.

In another aspect of the invention, a network capable computing device comprises an application, a socket API operatively coupled with the application and a TCP/IP protocol stack operatively coupled with the socket API, wherein the socket API receives a loopback call from the application and processes the loopback call without resort to the TCP/IP protocol stack.

In some embodiments, the socket API receives a non-loopback call from the application and invokes the TCP/IP protocol stack to process the non-loopback call.

In yet another aspect of the invention, a method for loopback processing on a computing device having an application and a TCP/IP protocol stack operatively coupled with a socket API comprises the steps of receiving by the socket API from the application a call, determining by the socket API whether the call is a loopback call and selectively invoking by the socket API the TCP/IP protocol stack to process the call based on an outcome of the determining step.

In some embodiments, the socket API processes the call without resort to the TCP/IP protocol stack in response to a determination that the call is a loopback call.

In some embodiments, the socket API invokes the TCP/IP protocol stack to process the call in response to a determination that the call is a non-loopback call.

In some embodiments, processing of the call by the socket API comprises storing data received on the call in a data store of the socket API.

In some embodiments, processing of the call by the socket API comprises retrieving data requested on the call from a data store of the socket API and transmitting the data to the application.

In some embodiments, the determining step comprises determining whether the call is associated with a loopback destination.

In some embodiments, the determining step comprises determining whether the call is addressed to a loopback address.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
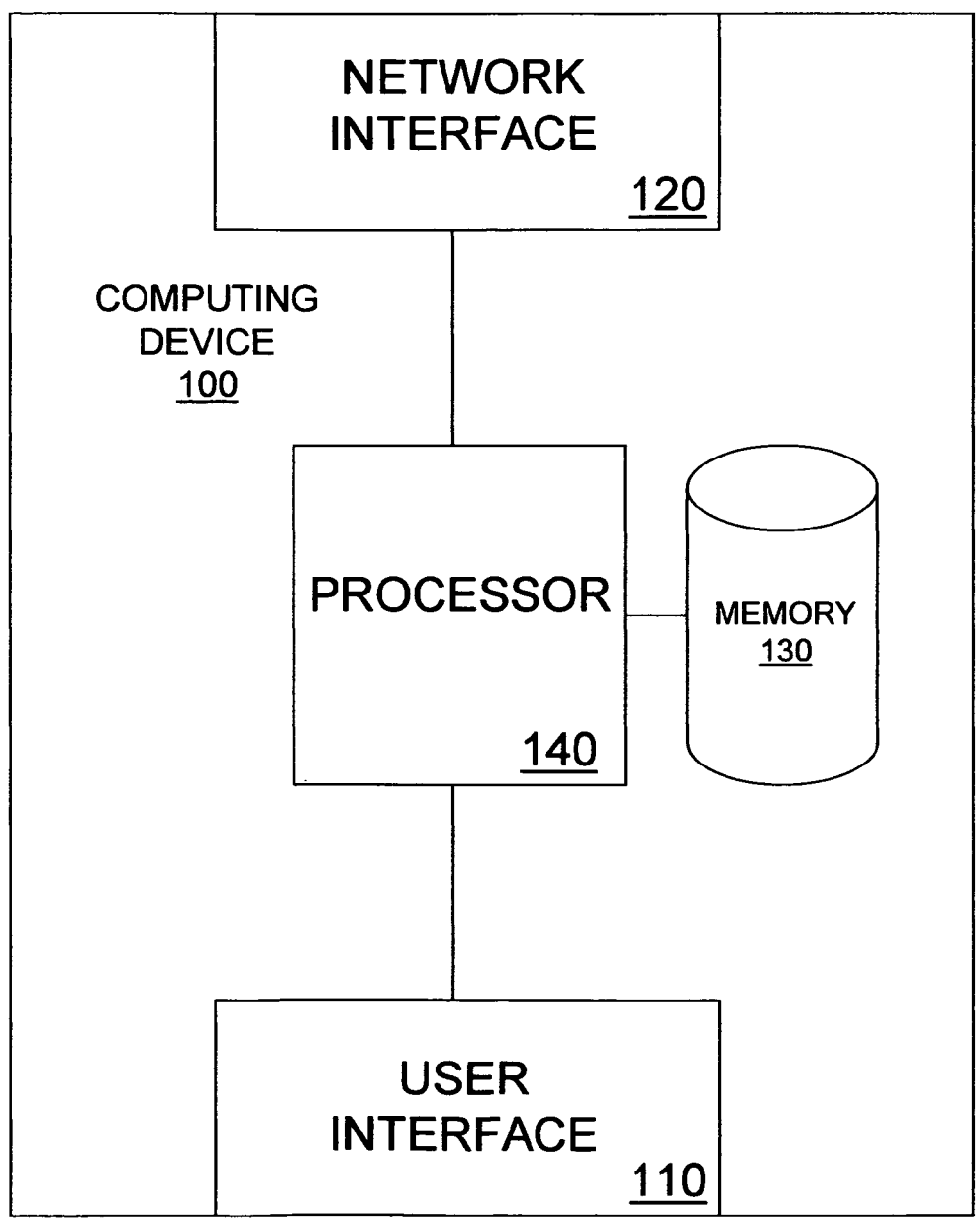
FIG. 1 shows a network capable computing device in some embodiments of the invention.

FIG. 1 shows a network capable computing device 100 in some embodiments of the invention. Computing device 100 has a processor 140 communicatively coupled between a user interface 110, a network interface 120 and a memory 130. Computing device 100 may be, for example, a personal computer, personal data assistant (PDA), server device, cellular phone or multifunction peripheral (MFP) device.

User interface 110 receives inputs from a user of computing device 100 via one or more input devices and displays outputs to the user via one or more output devices. Output devices include a display, such as a liquid crystal display (LCD), organic light emitting diode (OLED) display. Input devices include, for example, a finger or stylus-operated touch screen, a scroll wheel or ball, a keypad and/or voice command module.

Network interface 120 is a wired or wireless communication interface for transmitting and receiving information to/from other network capable devices over wired or wireless communication links. Network interface 120 may be, for example, a wired Ethernet interface, cellular network interface, wireless Ethernet (WiFi) interface or Worldwide Interoperability for Microwave Access (WiMAX) interface.

Figure 2:
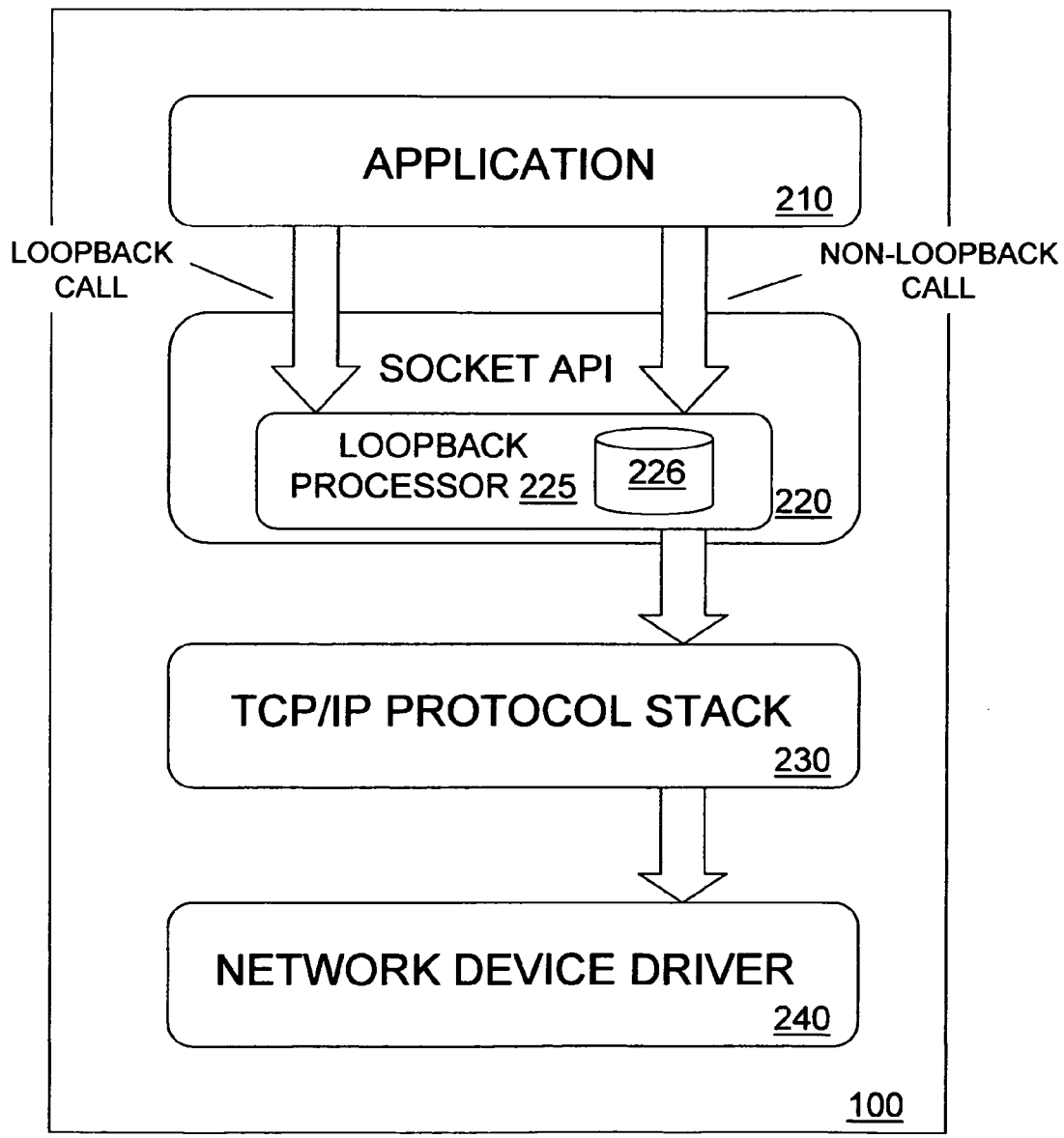
FIG. 2 shows software executable on the computing device in some embodiments of the invention.

Processor 140 executes in software operations supported by computing device 100. Turning to FIG. 2, the software elements of computing device 100 that are executable by processor 140 include an application 210, a socket API 220, a TCP/IP protocol stack 230 and a network device driver 240. Importantly, socket API 220 includes a loopback processor 225 and a loopback data store 226. The software elements that are executable by processor 140 are stored in memory 130, which includes one or more random access memories (RAM) and one or more read only memories (ROM). In some embodiments, socket API 220, TCP/IP stack 230 and network device driver 240 are integral to an embedded operating system.

Application 210 is a network oriented application, such as a web browser, that is capable of issuing loopback calls and non-loopback calls. These calls may be initiated by a user on user interface 10 or generated by application 210 without user intervention.

Socket API 220 is a network API that interfaces with application 210 and TCP/IP stack 230 and enables application 210 to communicate with loopback processes on computing device 100 via the loopback function as well as with remote computing devices via conventional TCP connections. Socket API 220 receives calls from application, creates sockets that provide endpoints for the calls, binds the sockets to destination addresses and removes the bindings and closes the sockets when they are no longer needed. Sockets may include one or more loopback sockets bound to a well-known loopback destination address, for example, 127.0.0.1, and one or more conventional TCP sockets bound to non-loopback destination addresses associated with remote computing devices.

Loopback processor 225 is a software subsystem of socket API 220 that enables computing device 100 to support the loopback function without resort to TCP/IP stack 230 or other lower level systems (e.g. network drivers). Loopback processor 225 processes loopback calls from application 210 that reference a loopback socket. Attendant to processing loopback calls, loopback processor 225 interfaces with called internal processes and may temporarily store in loopback data store 226 data sourced by called internal processes en route to application 210 as well as data sourced from application 210 en route to called internal processes.

TCP/IP stack 230 is a protocol stack that interfaces with socket API 220 and network device driver 240 and enables application 210 to communicate with remote computing devices via conventional TCP connections. TCP/IP stack 230 transmits appropriately formatted data between socket API 220 and network device driver 240 and provides TCP session and IP datagram services.

Network device driver 240 is software that interfaces between TCP/IP stack 230 and network interface 120 and enables application 210 to communicate with remote computing devices via conventional TCP connections. Network device driver 240 transmits appropriately formatted data between TCP/IP stack 230 and network interface 120 and, in some embodiments, provides Media Access Control (MAC) and Logical Link Control (LLC) services.

Figure 3:
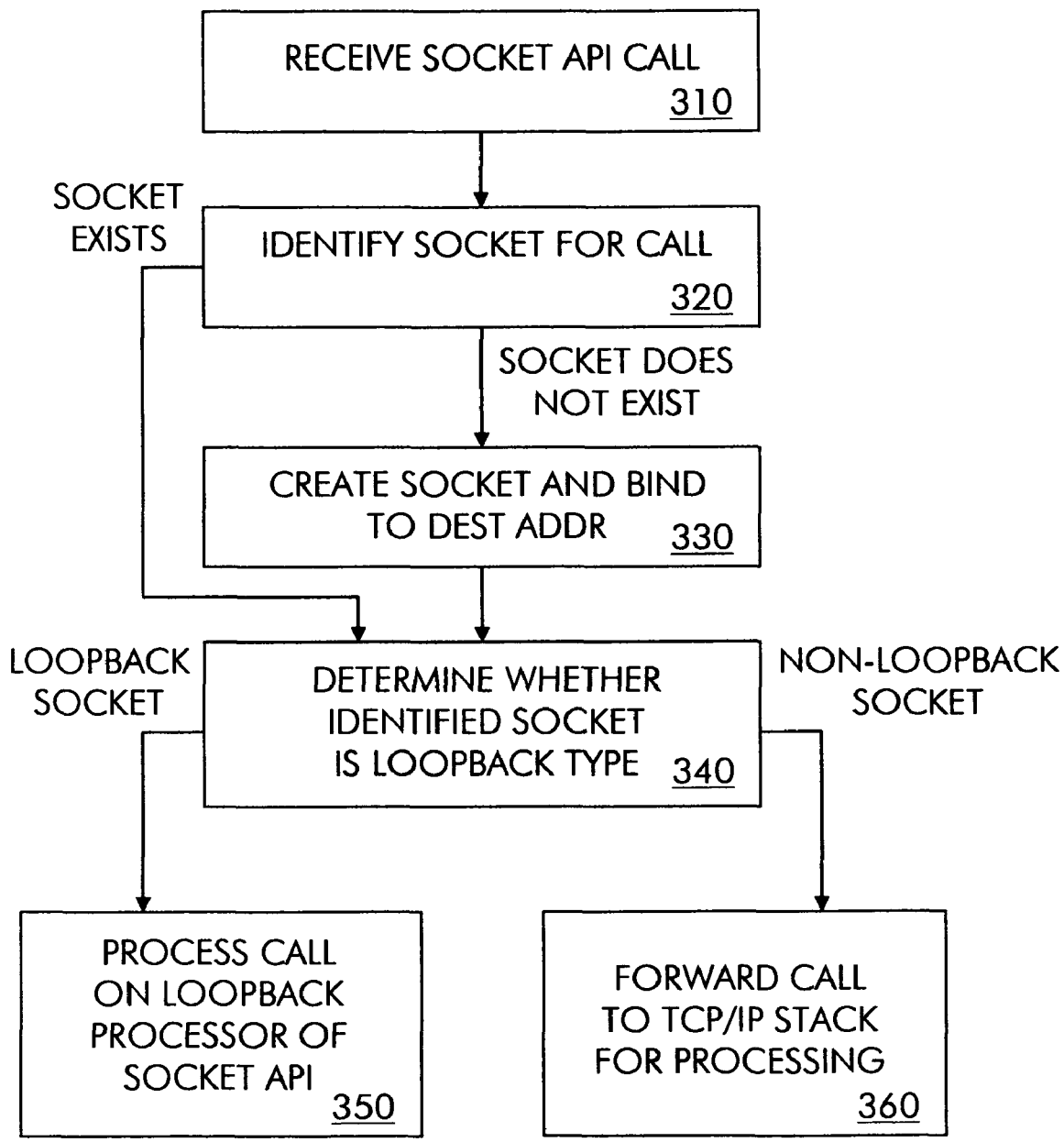
FIG. 3 shows a method for loopback processing on a computing device in some embodiments of the invention.

Referring to FIG. 3 in conjunction with FIG. 2, a method for loopback processing on computing device 100 is described and shown in some embodiments of the invention. Socket API 220 receives a socket API call from application 210 (310). In response to the socket API call, socket API 220 attempts to map the call to an existing socket (320). If a socket does not exist for the call, socket API 220 creates a socket and binds the socket to a destination address (330). Socket API 220 proceeds to determine whether the identified socket is a loopback type socket (340). If the identified socket is a loopback type socket, the call is processed on loopback processor 225 of socket API 220 without resort to TCP/IP stack 230 or other lower level systems (e.g. network drivers) (350). On the other hand, if the identified socket is a non-loopback socket (e.g. a conventional TCP socket), socket API 220 forwards the call to TCP/IP stack 230 for additional processing (360). In some embodiments, whenever a new socket is created and bound, loopback processor 225 is invoked to determine whether the socket is a loopback socket by checking whether the destination address is a loopback address and, if a determination is made that a socket is a loopback socket, loopback processor 225 flags the socket so that subsequent calls received on the socket are easily identified for processing by loopback processor 225.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. A network capable computing device, comprising:
an application;
a Transmission Control Protocol/Internet Protocol (TCP/IP) stack; and
a socket application programming interface (socket API) operatively coupled with the application and the TCP/IP stack and configured to receive a call from the application, determine whether the call is a loopback call, invoke the TCP/IP stack to process the call in response to determining that the call is a non-loopback call, and process the call without resort to any network protocol stack in response to determining that the call is a loopback call.

2. The device of claim 1, wherein the socket API is further configured to process the call without resort to any network device driver in response to determining that the call is a loopback call.

3. The device of claim 1, wherein processing of the call by the socket API comprises storing data received on the call in a data store of the socket API.

4. The device of claim 1, wherein processing of the call by the socket API comprises retrieving data requested on the call from a data store of the socket API and transmitting the data to the application.

5. The device of claim 1, wherein processing of the call by the socket API comprises interfacing with a called process on the device.

6. The device of claim 1, wherein determining whether the call is a loopback call comprises determining whether the call is associated with a loopback destination.

7. The device of claim 1, wherein determining whether the call is a loopback call comprises determining whether the call is addressed to a loopback address.

8. A method for loopback processing on a computing device having an application and a TCP/IP stack operatively coupled with a socket API, comprising the steps of:
    receiving, by the socket API, from the application, a plurality of calls;
    identifying, by the socket API, one or more loopback calls and one or more non-loopback calls within the plurality of calls;
    invoking, by the socket API, the TCP/IP stack to process the one or more non-loopback calls; and
    processing, by the socket API, without resort to any network protocol stack, the one or more loopback calls.

9. The method of claim 8, wherein the one or more loopback calls are further processed by the socket API without resort to any network device driver.

10. The method of claim 8, wherein the processing step comprises storing data received on the one or more loopback calls in a data store of the socket API.

11. The method of claim 8, wherein the processing step comprises retrieving data requested on the one or more calls from a data store of the socket API and transmitting the data to the application.

12. The method of claim 8, wherein the processing step comprises interfacing with a called process on the device.

13. The method of claim 8, wherein the identifying step comprises determining whether calls within the plurality of calls are associated with a loopback destination.

14. The method of claim 8, wherein the identifying step comprises determining whether calls within the plurality of calls are addressed to a loopback address.

* * * * *